J. E. STRONG.
CUSHIONING DEVICE FOR TIRES.
APPLICATION FILED FEB. 25, 1913.
1,081,005.
Patented Dec. 9, 1913.
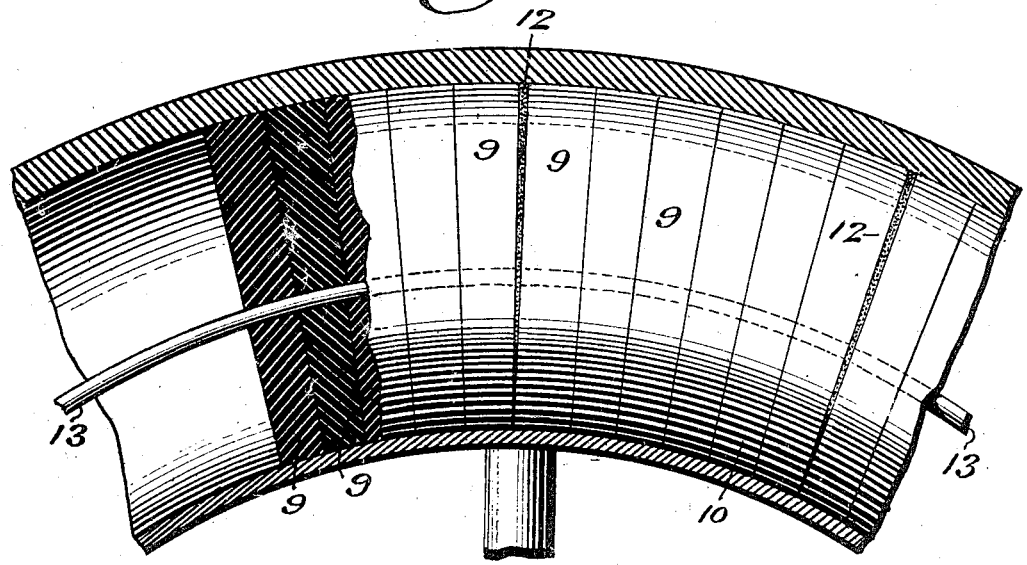
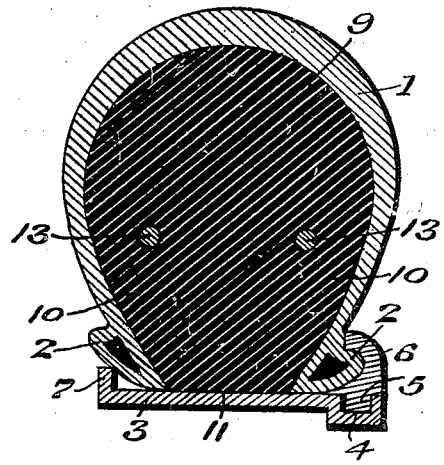
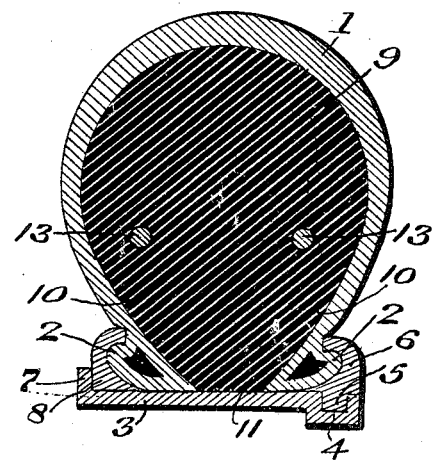
WITNESSES
P. F. Nagle
H. G. Dieterich
INVENTOR
James Edwin Strong.
BY Wiedersheim & Fairbanks,
ATTORNEYS

UNITED STATES PATENT OFFICE.

JAMES EDWIN STRONG, OF WILMINGTON, DELAWARE.

CUSHIONING DEVICE FOR TIRES.

1,081,005.

Specification of Letters Patent. Patented Dec. 9, 1913.

Application filed February 25, 1913. Serial No. 750,473.

*To all whom it may concern:*

Be it known that I, JAMES EDWIN STRONG, a citizen of the United States, and resident of Wilmington, in the county of Newcastle, State of Delaware, have invented a new and useful Cushioning Device for Tires, of which the following is a specification.

This invention relates to tires for automobiles, auto trucks, bicycles or like vehicles, and more particularly to a device to be used in connection with an outer shoe of a tire, in place of the usual inflated inner tube, and has for an object to provide a structure comprising a plurality of cushioning elements, which are so correlated and arranged in the novel manner hereinafter described as to form substantially a complete unitary structure adapted to fit within and maintain an outer casing in normal distended and resilient condition.

It has for a further object to provide a cushioning device for outer casings, which is constructed with due regard to its use in connection with detachable rim structures, whereby the device may readily be used in connection with wheel rims constructed in accordance with the present day practice.

It further consists of other novel features of construction, all as will be hereinafter fully set forth.

For the purpose of illustrating my invention, I have shown in the accompanying drawings one form thereof, which is at present preferred by me, since the same has been found in practice to give satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a side elevation partly in section of a tire embodying my invention. Fig. 2 represents a transverse section showing the device in place upon a rim before being clamped thereto. Fig. 3 represents a similar section showing the tire in fixed position upon the rim.

Similar numerals of reference indicate corresponding parts in the figures.

Referring to the drawings:—1 designates the usual outer casing or shoe of a tire provided with the customary circumferential side flanges 2, by means of which the shoe is held in position upon a rim. In the present instance, I have shown a rim 3 having at one side thereof a peripheral groove 4, to receive the flange 5 of a suitably formed locking ring 6, the latter being inwardly curved to conform to the contour of the shoe flange 2 and serve the purpose of a retaining means for one side of the tire. The opposite side of the rim 3, is provided with an upstanding peripheral flange 7, adapted to retain a suitably formed ring 8 which is likewise inwardly curved to grip the outer shoe, it being understood that this latter ring is forced into place, and the parts are held locked by the tension of the tire under compression.

9 designates a plurality of disks, preferably of elastic or resilient material, and having a shape in cross section corresponding to the contour of the usual tire. That is to say, in my present construction, the disks 9 are substantially egg-shaped in cross section, the lower side walls 10 converging toward the rim and terminating in a flat bearing surface 11 adapted to seat on the rim 3 and prevent side rocking or displacement of the tire under lateral stresses. It will also be noted that the base surface 11 of each disk 9, has a transverse dimension, sufficiently large to prevent the outer shoe being placed in position upon the detachable rim structure without subjecting the disks to a compressive action. In other words, when the disks 9 are placed within the outer shoe 1, the portion of the tire which seats upon the rim 3 will more than fill the space between the ring 6 and the flange 7 of the rim 3, and therefore, it is necessary, in order to place the ring 8 in position to employ a suitable clamp or tool to compress transversely the cushioning elements to the necessary extent, to allow the ring 8 to be seated as shown in Fig. 3. In this position, the tire is firmly locked to the rim, owing to the compression of the cushioning disks 9.

12 designates a plurality of wedge-shaped inserts or spacing elements, each positioned at suitable intervals between certain pairs of disks 9, in order to prevent an undue amount of space on the outer peripheral surface of the said disks. It will of course be apparent that owing to the radial arrangement of the disks 9 a certain amount of space would be left unfilled at this outer portion, which would permit a greater amount of play between the disks than would be advantageous for the best working conditions, and it is to avoid this action that I prefer to insert the wedge-shaped filler members 12.

13 designates a plurality of bonding or connecting wires, passing through the disks 9 and forming a continuous tying means upon which the disks are placed and arranged in the desired order before placing within the shoe 1. It will be apparent from Figs. 2 and 3, that the tying wires 13 are arranged preferably as shown therein, two of said wires being employed, arranged on each side of the axis of the tube and each wire being below the center of the cushioning devices 9, so that it will be seen that when said elements are assembled on said wires, and the latter are tightened by having their ends suitably secured together, the inner, narrower, contiguous, juxtaposed portions of said cushioning devices 9 are tightly compressed in a direction longitudinally in respect of said wires, whereby the outer, wider, curved portions of said devices 9 are held, to a slight extent, somewhat loosely in contact with each other, so that, the outer arc of the devices 9 is somewhat soft and pliable, since their contacting surfaces are not rigidly secured against each other by reason of the location of the wires 13, so that there is opportunity afforded for a slight inward compression of the outer arc-shaped portions of the elements 9, as well as a deflection in either direction longitudinally of the wires 13, in case the wheel meets with an obstruction. It therefore will be apparent that the inner contiguous portions of the cushioning devices 9 are tightly compressed against each other longitudinally, as well as transversely, by reason of my novel construction, so that I attain results which cannot be attained by any prior structure, with which I am familiar. My present construction is differentiated from prior devices, wherein a solid filler has been employed extending throughout the length of the outer shoe, because in said construction, the outer arc-shaped portion of said solid filler is when the parts are assembled tightly compressed and possesses little resiliency as compared with my device, and cannot be conveniently placed in position manually, as is the case with my invention, which can be readily installed on the road by unskilled labor.

It will be understood that the constructions seen in Figs. 2 and 3 show merely one type of locking or demountable rings which may be employed, as numerous other forms of locking or demountable rings may be employed, without departing from the spirit of my invention.

This device serves as a substitute for the ordinary air filled inner tube, and may be used, if desired, as a permanent resilient or cushioning means, within the outer shoe, or carried in the vehicle as an emergency device wherewith a punctured inner tube may be replaced without the usual long delay occasioned by inserting a new inner tube or patching the punctured inner tube, and inflating with air.

It will now be apparent that I have devised a complete unitary structure, simple in construction, comprising few parts, and embodying all the material elements necessary to produce an easy running resilient tire structure. Attention is directed particularly to the formation of the disks which are of such a size as to require a compressive action, in order to assemble the tire structure on a rim, there being therefore no danger of the tire becoming loose or detached from the rim under running condition. It will further be noted that by providing a comparatively large number of disks for each outer casing there is sufficient peripheral space, even with the wedge disks in place to allow full compression and insure proper absorption of the shock.

Having thus described my invention what I claim as new and desire to secure by Letters Patent, is:—

In a device of the character described, an outer shoe and a plurality of flat cushioning devices of substantially oval shape in cross section, having arc-shaped outer edges and inner edges adapted to seat against a retaining device for said shoe, in combination with a plurality of bonding wires extending through said cushioning devices and located on each side of the center thereof and intermediate of the centers of said disks and said inner edges thereof, whereby when said bonding wires are tightened the inner contiguous, juxtaposed edges of said cushioning devices are compressed in a direction longitudinally of said bonding wires, whereby the outer arcs of said cushioning devices are left in a somewhat pliable condition.

JAMES EDWIN STRONG.

Witnesses:
 ROBERT M. BARR,
 C. D. McVAY.